US008490893B2

(12) United States Patent
Centofante et al.

(10) Patent No.: US 8,490,893 B2
(45) Date of Patent: Jul. 23, 2013

(54) PUMP-LESS TONER DISPENSER

(75) Inventors: Charles A. Centofante, Los Altos, CA (US); Brian S. Boothman, San Jose, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 422 days.

(21) Appl. No.: 12/419,908

(22) Filed: Apr. 7, 2009

(65) Prior Publication Data

US 2010/0254731 A1 Oct. 7, 2010

(51) Int. Cl.

| | |
|---|---|
| ***B05B 7/30*** | (2006.01) |
| ***B05B 1/30*** | (2006.01) |
| ***G01F 11/00*** | (2006.01) |
| ***B65D 83/00*** | (2006.01) |
| ***G03G 15/08*** | (2006.01) |

(52) U.S. Cl.

USPC ........... 239/346; 239/373; 239/411; 239/579; 222/335; 222/399; 141/83; 399/260

(58) Field of Classification Search

USPC ................. 222/335, 394, 395, 396, 397, 398, 222/399, 400.7, 405; 239/337, 354, 373, 239/411, 579, 583, 586; 141/83; 399/258, 399/260; 251/5

See application file for complete search history.

(56) References Cited

U.S. PATENT DOCUMENTS

| | | | | |
|---|---|---|---|---|
| 1,066,263 | A * | 7/1913 | Dohn | 239/365 |
| 1,764,823 | A * | 6/1930 | Bowlus | 222/335 |
| 1,806,784 | A * | 5/1931 | Breuer | 239/348 |
| 2,713,988 | A | 7/1955 | Kitterman | |
| 3,674,182 | A * | 7/1972 | Roche | 239/654 |
| 4,167,503 | A | 9/1979 | Cipriani | |
| 4,183,673 | A | 1/1980 | Easley et al. | |
| 4,585,148 | A | 4/1986 | Ito | |
| 4,630,654 | A | 12/1986 | Kennedy, Jr. | |

(Continued)

FOREIGN PATENT DOCUMENTS

| | | |
|---|---|---|
| EP | 0 099 252 | 1/1984 |
| EP | 0 623 445 | 1/1998 |

(Continued)

OTHER PUBLICATIONS

International Search Report and Written Opinion mailed Jun. 10, 2010 from related PCT International Application No. PCT/US2010/030209, pp. 8.

(Continued)

*Primary Examiner* — Ryan Reis

(74) *Attorney, Agent, or Firm* — Aleksander Medved

(57) ABSTRACT

Methods, systems, and apparatus, including computer programs encoded on a computer storage medium, for dispensing toners. In one aspect, a toner dispensing system includes a toner container; a cap and valve assembly coupled to the toner container, the cap and value assembly including: a movable valve assembly, the movable valve assembly having a first position and a second position, a toner path, and an air inlet path, where in a first valve assembly position the toner path and the air inlet path are closed, and in a second valve assembly position the toner path and the air inlet path are open; an air assembly including a first air supply coupled to the air path of the cap and valve assembly and a second regulated air supply coupled to the toner container; and a control assembly for controlling the second air supply.

17 Claims, 12 Drawing Sheets

U.S. PATENT DOCUMENTS

| | | | | |
|---|---|---|---|---|
| 4,794,085 | A | 12/1988 | Jessop et al. | |
| 4,898,308 | A | 2/1990 | Rudick | |
| 5,115,842 | A | 5/1992 | Crafts et al. | |
| 5,337,794 | A | 8/1994 | Nishiyama et al. | |
| 5,375,634 | A | 12/1994 | Egger | |
| 5,431,200 | A | 7/1995 | Mariotti | |
| 5,460,297 | A | 10/1995 | Shannon et al. | |
| 5,539,952 | A | 7/1996 | Hayes et al. | |
| 5,845,823 | A | 12/1998 | Lindmayer | |
| 5,938,080 | A | 8/1999 | Haaser et al. | |
| 5,955,116 | A | 9/1999 | Kehoe et al. | |
| 5,969,619 | A | 10/1999 | Niemiro et al. | |
| 6,053,218 | A | 4/2000 | Boers | |
| 6,095,373 | A | 8/2000 | Boers | |
| 6,146,009 | A | 11/2000 | Boers | |
| 6,206,250 | B1 | 3/2001 | Boers | |
| 6,230,938 | B1 | 5/2001 | Boers | |
| 6,234,218 | B1 | 5/2001 | Boers | |
| 6,254,363 | B1 | 7/2001 | Fink | |
| 6,290,110 | B1 * | 9/2001 | Boers | 222/559 |
| 6,561,237 | B1 | 5/2003 | Brass et al. | |
| 6,669,358 | B2 | 12/2003 | Shimoda | |
| 6,701,975 | B1 | 3/2004 | Neal | |
| 6,708,901 | B2 * | 3/2004 | Hubmann et al. | 239/310 |
| 6,742,682 | B2 | 6/2004 | Batschied | |
| 7,208,253 | B2 | 4/2007 | Mayer et al. | |
| 7,278,776 | B2 | 10/2007 | Helbing et al. | |
| 7,603,054 | B2 | 10/2009 | Katsuyama et al. | |
| 7,958,915 | B2 | 6/2011 | Maguire | |
| 2001/0023900 | A1 * | 9/2001 | Stewart et al. | 239/304 |
| 2003/0000964 | A1 | 1/2003 | Schroeder et al. | |
| 2003/0142580 | A1 | 7/2003 | Maguire | |
| 2004/0144800 | A1 | 7/2004 | Danby et al. | |
| 2004/0191086 | A1 | 9/2004 | Paukovits, Jr. | |
| 2004/0197435 | A1 | 10/2004 | Shepherd et al. | |
| 2005/0052945 | A1 | 3/2005 | Maguire | |
| 2005/0226655 | A1 | 10/2005 | Katsuyama et al. | |
| 2010/0140288 | A1 | 6/2010 | Jones et al. | |
| 2010/0254730 | A1 | 10/2010 | Centofante et al. | |

FOREIGN PATENT DOCUMENTS

| | | |
|---|---|---|
| EP | 1 208 041 | 6/2006 |
| ES | 8707882 | 11/1987 |
| FR | 2672279 | 8/1992 |
| NL | 8700226 | 8/1988 |
| WO | WO 2005/019093 | 3/2005 |
| WO | 2007/039378 | 4/2007 |

OTHER PUBLICATIONS

Decker, et al., “Fast Colour Change for Thermoplastics,” Klockner Desma GmbH, Achim, Special Reprint of Kunststaff-Berater 1-2, 2006, 4 pages.

Ferro Corporation, “Liquid Color for Thermoplastics,” 1 page.

Charvat, Robert A., “Coloring of Plastics: Fundamentals,” pp. 291 and 292, 2004.

Plastics Technology, Blending & Dosing Knowledge Center presented by Maguire, Liquid Color Dosers, [retrieved from the internet on Aug. 16, 2011], URL http://www.ptonline.com/kc/blending/liquid/, pp. 1 and 2.

X-Pert™ Paint Mixing Systems, Inc., [retrieved from the internet on Aug. 23, 2011], URL http://www.x-pertinc.com/about.htm, p. 1 of 1.

* cited by examiner

PUMP-LESS TONER DISPENSER

BACKGROUND

This specification relates to dispensing toner.

A toner is a pure color of paint including several elements including a pigment, a solvent, and a resin. Liquid toners include paints, inks, colorants and other fluids used to dye or color a base material. Toners are often mixed together in order to produce a particular result. For example, automotive paints are typically created using a precise mixture of toners. The mixture for a particular color is defined by a recipe. The recipe identifies the toners, as well as the amounts of each toner. Failure to mix the correct amount of toner results, for example, in a paint that does not exactly match the desired color.

Conventional paint mixing is a manual process. A human user reviews the recipe and then manually pours each toner into a container, e.g., on a scale, until the specified amount of each toner has been poured. However, human pouring often leads to inaccurate pours, especially when a precise amount of each toner is required to form a specific toner mix.

Motorized toner dispensing apparatuses typically use one or more motors to control a spout for a container of toner. However, conventional motorized toner dispensers do not adjust quickly and often over or under pour the toner. Conventional motorized toner dispensing apparatuses use a type of pump activated, for example, by a motor, air driven or electric, which due to the nature of the pump, requires occasional calibration. Since toners contain pigments that can be abrasive, the pumps are subject to wear, leading to the need to calibrate the pump. Additionally, conventional spouts are poorly sealed leading to dripping and introduction of contaminants into toner containers as well as curing of toner within the containers. Thus, conventional spouts require periodic cleaning, especially when changing empty toner containers.

SUMMARY

This specification describes technologies relating to dispensing toner.

In general, one aspect of the subject matter described in this specification can be embodied in a toner dispensing system that includes a toner container; a cap and valve assembly coupled to the toner container, the cap and value assembly including a movable valve assembly, the movable valve assembly having a first position and a second position, a toner path, and an air inlet path, where in a first valve assembly position the toner path and the air inlet path are closed, and in a second valve assembly position the toner path and the air inlet path are open; an air assembly including a first air supply coupled to the air path of the cap and valve assembly and a second regulated air supply coupled to the toner container; and a control assembly for controlling the second air supply.

These and other embodiments can optionally include one or more of the following features. The toner dispensing system further includes a scale for measuring dispensed toners from the cap and valve assembly; and a flow control system that regulates the second air supply to control the flow of toner through the toner path based on the scale measurement. Controlling the flow of toner further includes adjusting the second regulated air supply to the toner container, and where the air pressure of the toner container determines the flow rate of toner through the toner path.

The cap and valve assembly further includes an elongated outer tube and an elongated inner tube, the elongated inner tube being movable relative to the outer tube, the elongated outer tube including openings for the air intake path and the toner path, the inner tube including the air intake path and the toner path, where the movable valve assembly moves the inner tube relative to the outer tube such that the air inlet path and toner path are aligned with respective openings in the outer tube. The cap and valve assembly further includes an anti-drip cap where the anti-drip cap is movable relative to an outlet of the toner path such that in a first position the outlet is open allowing toner to pass through the outlet from the toner path and in a second position the outlet is closed sealing the toner path preventing substantially all toner from passing through the outlet. The air inlet path selectively allows air to be injected into the toner container. The control assembly further controls the first air supply to selectively position the movable valve assembly in an open and a closed position. The first air supply and the second air supply have a common source or a separate source.

In general, one aspect of the subject matter described in this specification can be embodied in methods that include the actions of identifying an amount of toner to dispense; initializing a scale to measure the amount of dispensed toner; activating a first air supply, the first air supply configured to provide air to a toner container when a valve is moved to a dispensing position; activating a second air supply, the second air supply moving the valve to the dispensing position such that toner is dispensed at a specified flow rate; monitoring the scale to determine when a first threshold amount of toner has been dispensed; when the threshold amount of toner has been dispensed, reducing the flow rate of the toner to a reduced flow rate; monitoring the scale to determine when a second threshold amount of toner has been dispensed; and deactivating the first air supply when the second threshold amount of toner has been dispensed, the deactivating of the first air supply stopping the flow of toner. Other embodiments of this aspect include corresponding systems, apparatus, and computer program products.

These and other embodiments can optionally include one or more of the following features. The method further includes deactivating the second air supply when the second threshold amount of toner has been dispensed, the deactivating of the second air supply moving the valve out of the dispensing position. The method further includes receiving a user selection of a recipe, the recipe identifying toners and corresponding amounts to be dispensed and dispensing a first toner in the recipe and then a second toner from the recipe. Reducing the flow rate includes reducing a pressure in the toner container provided by the first air supply. Moving the valve to the dispensing position opens a toner path and an air path, the air path allowing the air to be injected into the toner container and where moving to a closed position seals the toner path and seals the air path.

Particular embodiments of the subject matter described in this specification can be implemented so as to realize one or more of the following advantages. A precise amount of a toner can be dispensed using a toner dispensing system. The toner dispensing system provides a high dispensing accuracy by using flow monitoring and a regulated dispenser coupled using closed loop signals from an electronic scale. The toner dispensing system replaces a container cap supplied from a toner manufacturer with a cap including a two position valve (e.g., a shuttle valve) for positive shut-off of toner flow and air pressure into the container. The valve cap also incorporates a moving wiping anti-drip cap to prevent drips after dispensing and to seal the end of the toner delivery device from air and containments and reduce curing of toner. The toner dispenser directs toner for dispensing from the bottom of the toner container, which avoids dispensing from the top surface where partial curing can occur due to air exposure.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
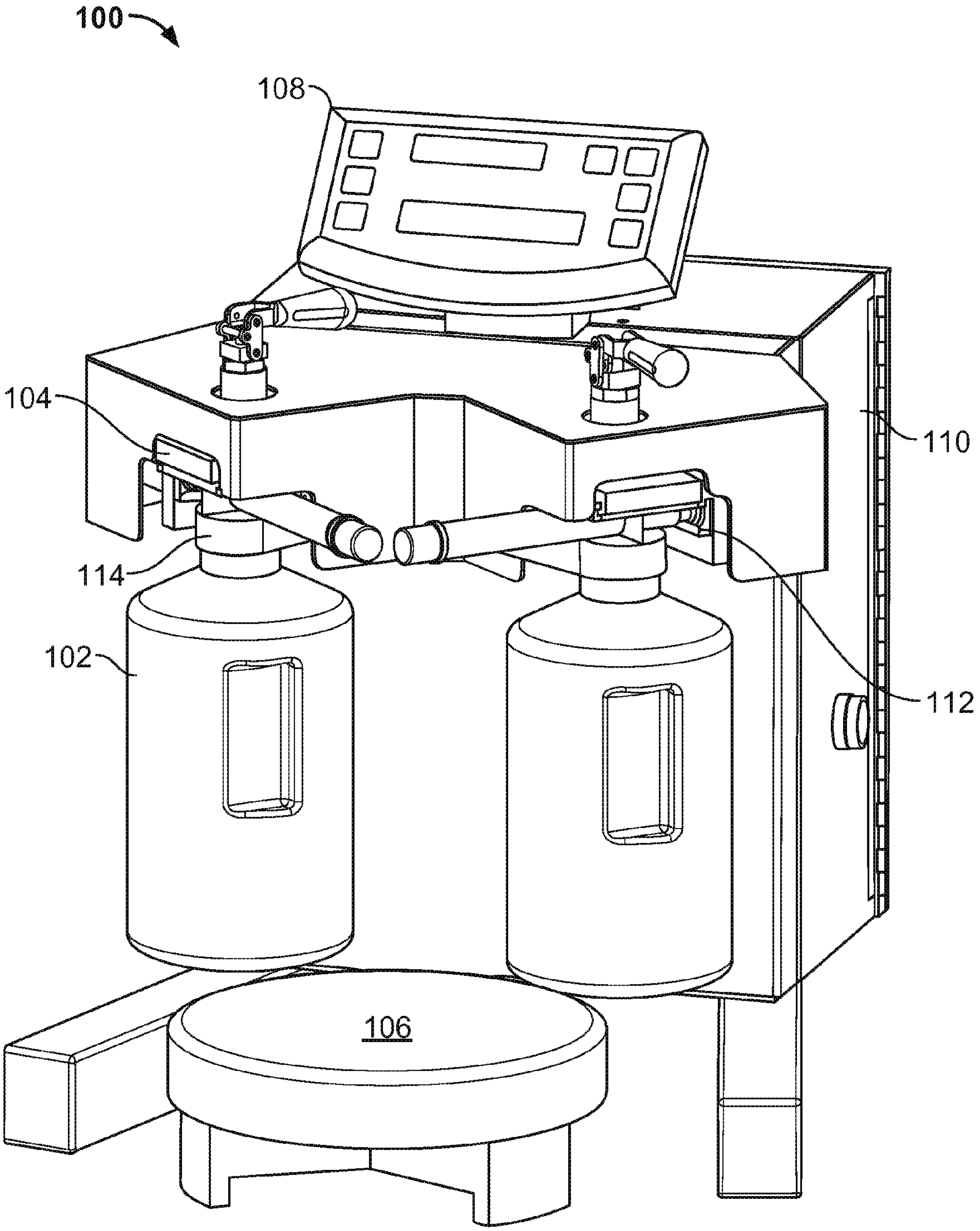
FIG. 1 is an isometric view of an example toner dispenser.

FIG. 1 is an isometric view of an example toner dispenser 100. The toner dispenser 100 includes first and second toner containers 102, first and second cap and valve assemblies 104, a scale 106, an optional scale control interface 108, and a housing 110.

Each toner container 102 contains a volume of a respective toner (e.g., respective paint colors). The toner containers 102 can have different sizes depending on the application (e.g., half liter, liter, and two liter container volumes). Larger size containers can be remotely stored, and through use of an adapter and tubing, the contents of the larger containers can be dispensed using the cap and valve assemblies 104.

Each of the toner containers 102 are coupled to a respective cap and valve assembly 104 using a cap 114. Each cap and valve assembly 104 couples the respective toner container 102 to a horseshoe shaped coupling device 112 to allow dispensing of a particular toner. In some implementations, each valve assembly 104 has a flange molded on an end of a shuttle valve that engages with the coupling device 112. The coupling device 112 is also coupled to an air cylinder that drives a plunger of the valve assembly 104 to open and close ports for air paths and toner dispensing.

In particular, the cap and valve assemblies 104 each provide a toner path for dispensing toner as well as an air path from the housing 110 for injecting air or another gas (e.g., an inert gas) into the corresponding toner container 102. Injecting air or another gas generates pressure causing toner to move into an open toner path. The cap and valve assemblies 104 include an air regulated movable valve (e.g., a shuttle valve) that can be controlled along with the air provided to the toner container 102 to dispense precise amounts of toners from the corresponding toner container 102. The structure of the cap and valve assembly is described in greater detail below with respect to FIG. 2.

The scale 106 provides weight measurements for dispensed toners. In particular, the scale 106 is positioned such that toners dispensed from the cap and valve assemblies 104 are collected in a container positioned on a surface of the scale 106. The scale provides precise measurements of the amount of toner dispensed from one or more of the cap and valve assemblies 104. For example, the toner dispensed can be controlled within one drop or substantially 25 thousands of a gram. The scale 106 can be coupled to the control interface 108, for example, to provide weight measurements to the scale control interface 108 at a specified frequency (e.g., 100 times per second).

Additionally, or alternatively, the scale 106 can include a separate display providing a measurement readout (e.g., an LCD display of measured weight). The scale 106 or scale control interface 108 can also include a zeroing function to zero the scale, e.g., when an empty container is placed on the scale or for calibration in dispensing each toner. The scale can also provide information, e.g., scale readings, to a flow controller. The flow controller can be part of the scale control interface 108 or a separate flow controller, e.g., in the housing 110.

The housing 110 provides an interface for controlling the toner dispensing system 100 with a host computer system including software from the toner manufacturer for storing one or more color recipes. Alternatively, the host computer system can be incorporated within the housing 110, be coupled externally, or accessed over one or more computer networks to provide recipes.

A toner mixing recipe is a set of instructions for creating a particular toner mix. The recipe includes particular toners as well as the amounts, either by weight or parts of a ratio, of each toner. In some implementations, the recipe identifies the constituent toners in a particular mixing order. In some implementations, the recipe includes other instructions for creating the toner mix. For example, a recipe for 1989 Ford Performance White includes:

1 [toner 1, Bright White], [138.00 grams of toner 1]

2 [toner 2, Dark Black], [0.6 grams of toner 2]

3 [toner 3 Chrome Yellow], [2.5 grams of toner 3].

In some implementations, the recipe is encoded, for example in XML format, that can be read by the dispensing system 100 (e.g., by the flow controller) to dispense the identified amount of each toner. An example XML recipe for generating a color “Dark Highland Green” is reproduced below:

<?xml version="1.0" encoding="utf-8" ?>
- <Tints>
- <BatchInfo>
<NexaRef>LFG2B</NexaRef>
<Color>Dark Highland Green</Color>
<Manufacturer>Ford</Manufacturer>
<Code>PX</Code>
<Volume>6.0 oz</Volume>
<NumTints>9</NumTints>
</BatchInfo>
- <Tint>
<TintName>p425-954</TintName>
<NonCumulative>27.6</NonCumulative>
<Actual>0.0</Actual>
<Adjustment>0.0</Adjustment>

-continued

```
</Tint>
- <Tint>
<TintName>p420-982</TintName>
<NonCumulative>23.3</NonCumulative>
<Actual>0.0</Actual>
<Adjustment>0.0</Adjustment>
</Tint>
- <Tint>
<TintName>p425-984</TintName>
<NonCumulative>4.6</NonCumulative>
<Actual>0.0</Actual>
<Adjustment>0.0</Adjustment>
</Tint>
- <Tint>
<TintName>p420-942</TintName>
<NonCumulative>2.0</NonCumulative>
<Actual>0.0</Actual>
<Adjustment>0.0</Adjustment>
</Tint>
- <Tint>
<TintName>p425-900</TintName>
<NonCumulative>0.9</NonCumulative>
<Actual>0.0</Actual>
<Adjustment>0.0</Adjustment>
</Tint>
- <Tint>
<TintName>p425-957</TintName>
<NonCumulative>4.4</NonCumulative>
<Actual>0.0</Actual>
<Adjustment>0.0</Adjustment>
</Tint>
- <Tint>
<TintName>p420-938</TintName>
<NonCumulative>10.6</NonCumulative>
<Actual>0.0</Actual>
<Adjustment>0.0</Adjustment>
</Tint>
- <Tint>
<TintName>p425-950</TintName>
<NonCumulative>24.6</NonCumulative>
<Actual>0.0</Actual>
<Adjustment>0.0</Adjustment>
</Tint>
- <Tint>
<TintName>p192-5600</TintName>
<NonCumulative>78.9</NonCumulative>
<Actual>0.0</Actual>
<Adjustment>0.0</Adjustment>
</Tint>
</Tints>
```

In the above XML recipe, there are nine different toners used to generate the final output of 6 oz of the "Dark Highland Green". Each toner has a specified identifier and an amount of toner (e.g., in grams). Thus, the dispensing system is used to dispense each precise amount of toner in order generate the final color.

In some implementations, the housing 110 includes a flow control interface for controlling the toners according to the selected recipe. The flow control interface can delay dispensing of a particular toner until a user input is received indicating that further dispensing can occur. For example, a user can confirm that the particular toner to be dispensed is in position and secured within a particular dispensing station of the toner dispensing system 100.

When there are more toners in the recipe than the dispensing system 100 holds (e.g., more than two dispensing stations for dispensing system 100), the scale or flow control interfaces can be used to restart dispensing after swapping out toners. In particular, a given cap and valve assembly and toner container pair can be swapped out as a unit.

The scale control interface 108 can be coupled to the flow controller to dispense the correct amount of toner upon initiation by a user. The flow controller is coupled to one or more air supplies used to control toner dispensing from a particular toner container according to the recipe information and the scale data.

The housing 110 provides the support for the toner dispenser 100. The housing 110 houses control lines including electrical circuitry providing information to and from various components of the dispensing system. For example, communication lines between the scale 110 and the scale control interface 108, and communication from scale 110 or scale control interface 108 to the flow control. Additionally, the housing 110 can include one or more air lines providing air from an air supply (e.g., compressed air storage, an air compressor, or an exterior air supply connection) to each cap and valve assembly 104. In some implementations, a single air source (air supply) is used to provide air to the system. The supply can be split into one or more regulated paths for controlling various components (e.g., the respective movable valves and input air flows to toner containers).

The housing 110 also houses support structures for the dispensing system 100. For example, the housing 110 includes legs forming a stable base for the dispensing system 100. Other support structures can provide support for holding components of the dispensing system 100 in position including the toner repositories, scale control interface 108, and flow controller. Additionally, the housing 110 can include various computer circuitry, for example, as part of the flow controller. For example, the housing can include one or more processors and computer readable storage devices where the one or more computer readable storage devices can include recipes for toner mixes as well as instructions that, when executed by the one or more processors, perform operations including managing the flow controller or managing the scale control interface 108.

The housing 110 can also provide external access connections for coupling the dispensing system 100 to one or more electrical sources, air sources, and computer or networking sources. For example, the scale control interface 108 can retrieve toner mixing recipes from an external computer through a network interface.

Figure 2A:
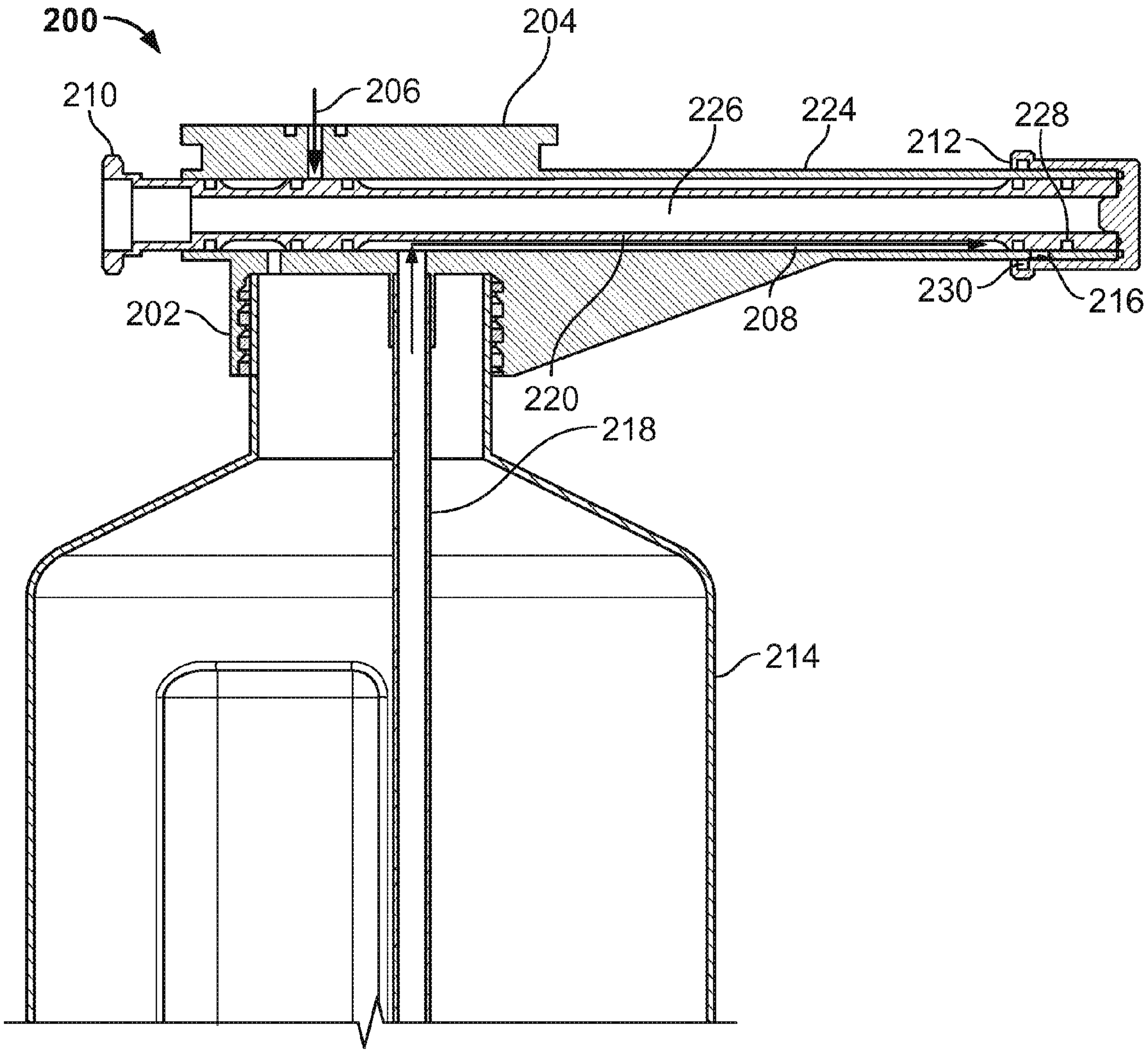
FIG. 2A is a longitudinal cross-sectional view of an example cap and valve assembly in a closed position.
Figure 2B:
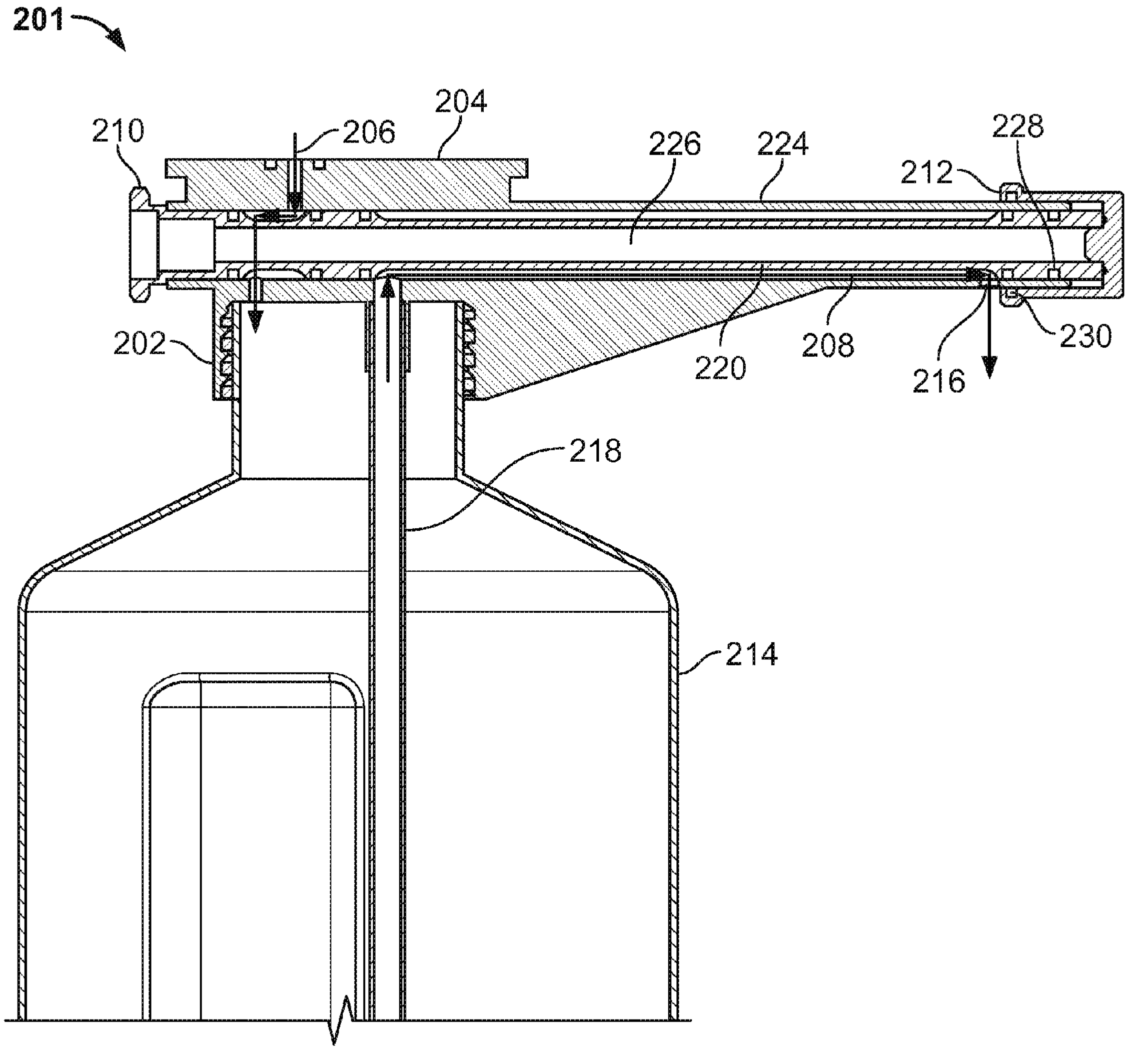
FIG. 2B is a longitudinal cross-sectional view of an example cap and valve assembly in an open position.

FIGS. 2A-2B are longitudinal cross-sectional views of an example cap and valve assembly 200 in a closed position and cap and valve assembly 201 in an open position. The cap and valve assembly 200 includes a toner container coupler 202, a housing coupler 204, an input air path 206, a toner path 208, a movable valve 210, and an anti-drip cap 212. The cap and valve assembly 200 is coupled between a toner container 214 (partially shown) and a housing of a dispensing system (e.g., housing 110 of dispensing system 100 in FIG. 1). The cap and valve assembly 200 provides an elongate portion 224 for dispensing precise toner amounts from a distal end of the elongate portion 224 to a container, for example, to be measured for mixing several toners together according to a recipe.

The toner container coupler 202 couples the cap and valve assembly 200 to the toner container 214. In one implementation, the toner container coupler 202 includes a threaded coupler configured such that threaded toner container bottles can be screwed to the threaded coupler. For example, water based toners can be stored in toner containers made from plastic and having threaded tops. Alternatively, in another implementation, the toner container coupler 202 includes a clamping coupler for securely sealing the toner container to the cap and valve assembly 200 (e.g., for solvent based and other toners).

The housing coupler 204 couples the cap and valve assembly 200 to the housing of the dispensing system. In some implementations, the housing coupler 204 is configured to slide into a receiver of the housing. The receiving of the housing includes a valve coupler for coupling the housing to the movable valve 210 and an input air coupler for coupling the input air path 206 to the housing. In some implementations, the input air coupler includes a poppet valve to provide an airtight seal between the housing and the input air path 206 and to provide air to the input air path only when the cap and valve assembly 200 is secured to the housing. The housing coupler 204 is described in greater detail below with respect to the housing side of the coupler in FIG. 3.

The input air path 206 provides a path, when the movable valve 210 is in an open position, from the housing to the toner container 214. In particular, the housing coupler 204 aligns an air line in the housing with an opening of the input air path 206. When the movable valve 210 is in the open position (FIG. 2B), air can pass from the air line in the housing through a first aperture entering the input air path 206 and out a second aperture into the toner container 214. The increased air pressure in the toner container 214 causes toner to move into the toner path 208 at a particular flow rate. When the movable valve 210 is in the closed position (FIG. 2A), the input air path 206 is blocked such that air cannot flow into the toner container 214. The air pressure applied through the input air path 206 can be adjusted to control the flow rate of toner through the toner path 208. Thus, the greater the air pressure applied to the toner container 214, the greater the flow rate through the toner path 208. Thus, a regulated air supply allows for control of the flow rate.

The toner path 208 provides a path, when the movable valve 210 is in an open position, from the toner container 214, along a channel along the movable valve 210 in the elongate portion 224 of the cap and valve assembly 200, to an output 216 (e.g., an aperture in the elongate portion 224) of the cap and valve assembly 200. Specifically, the toner path 208 is formed from channel formed between an outer portion of the elongate body and the movable valve 210. A valve body seal 228 can optionally form the end of the toner path 208.

In particular, a toner input tube 218 is coupled to a toner channel 220 that runs along an interior portion of the elongate portion 224 of the cap and valve assembly 200. In some implementations, the toner input tube 218 is part of the cap and valve assembly 200. In other implementations, the toner input tube 218 is part of the toner container or a separate component coupled to the cap and valve assembly 200. In some implementations, the toner input tube 218 extends to substantially the bottom of the toner container 214. Positioning the toner input tube 218 toward the bottom of the toner container allows for the toner to be directed from the bottom of the toner container rather than the top, which can have a surface skin formed due to curing of the toner (e.g., due to exposure to air in the container or through evaporation in water based toners).

In some implementations, a filter is positioned on the toner path 208 to prevent impurities from passing through the toner path. For example, the filter can be coupled to the toner input tube 218. The filter can be attached to the bottom of the toner input tube 218 as toners from the toner container enter the toner path 208. Alternatively, the filter can be coupled between the toner input tube 218 and the toner channel 220.

When the cap and valve assembly 200 is coupled to the toner container, toner can pass into the toner path 208. However, when the movable valve 210 is in the closed position (FIG. 2A), the output 216 is blocked such that toner can not pass through the output 216. When the movable valve 210 is in the open position (FIG. 2B), toner can flow along the toner path 208 and is dispensed through the output 216. In particular, toner passes through the toner input tube 218 along the toner channel 220 and out the output 216 aperture.

The movable valve 210 moves between open and closed positions. The open position allows toners to flow through the toner path 208 and out the output 216. In particular, the open position allows air to pressurize the toner container such that the toner flows up the toner input tube 218 and along the toner path 208. The closed position of the movable valve 210 prevents air from entering the toner container and prevents toners from passing through the toner path 208. The position of the movable valve 210 is controlled by application of air pressure.

The movable valve 210 is coupled to a moveable plunger 226 within a lumen formed in the cap and valve assembly 200. In particular, the movable valve 210 slides along the elongated portion of the cap and valve assembly 200 in response to air pressure applied to the movable valve 210. The amount of toner to be discharged through the output 216 is regulated by the amount of air pressure within the toner container. As the scale (e.g., scale 106 of FIG. 1) measures a dispensed amount approaching the recipe amount of toner in a collection container, a programmable pressure regulator backs off the air pressure to reduce the amount of toner discharged from a stream to a series of toner droplets. When a particular amount of toner is weighed by the scale, the programmable pressure regulator vents to atmosphere thereby reducing the pressure within the toner container to zero and a solenoid valve within the housing shuttles the moving plunger to the closed position, which closes off both the air and toner paths. In some implementations, the maximum displacement of the movable valve 210 is substantially 10 mm.

The flow rates of various toners are dependent upon the air pressure within the toner container and the viscosity of the toner. Consequently, the flow rate of toners can be controlled for toners having a known viscosity by controlling the air pressure to the toner container. When air is not applied, or applied below a threshold pressure, the flow rate of the toner is zero.

Movement of the movable valve 210 to the open positions aligns paths in the movable valve 210 to the input air path 206 and toner path 208 by a specified amount. In particular, the toner channel 220 of the toner path 208 moves with the movable valve 210 (e.g., the toner channel 220 formed in the plunger of the movable valve). In the open position, the toner channel 220 is moved as part of the movable valve 210 to align with the output 216 formed in the elongate body 224 of the cap and valve assembly 200. When the movable valve 210 is in the closed position, the toner channel 220 is not aligned with the output 216 such that toner does not pass from the toner channel 220 to the output 216

Similarly, when the movable valve 210 is in the open position, a portion of the movable valve 210 forming the air input path 206 is aligned with portions formed in the elongate portion 224 of the cap and valve assembly 200 such that air can pass through the cap and valve assembly and into the toner container. When the movable valve 210 is in the closed position, the portion of the movable valve 210 forming the air input path is not aligned with portions formed in the elongate portion 224 of the cap and valve assembly 200 such that air cannot pass through the cap and valve assembly 200 and into the toner container.

The anti-drip cap 212 is positioned at a distal portion of the movable valve 210 and moves in concert with the movable valve 210. The anti-drip cap 212 is coupled to the movable valve 210 and includes a sealing portion that wraps around the outside of the elongate portion 224. The anti-drip cap 212 is a moving wiping cap that prevents drips after dispensing and seals the end of the cap and valve assembly from air and containments. When the movable valve 210 is in the closed position, the anti-drip cap 212 extends along the outside of the elongate portion 224 beyond the output 216 of the toner path. Consequently, the output 216 is blocked from both sides by a combination of the anti-drip cap 212 and the non-alignment of the movable valve 210. Blocking the exterior of the output 216 prevents dripping of excess toner from the output 216 when the movable valve 210 is in the closed position. Additionally, the anti-drip cap 212 can include one or more seals 230, e.g., o-rings or other sealing structures.

When the movable valve 210 is in one of the open positions, the anti-drip cap 212 is positioned along the elongate portion 224 such that the output 216 is clear. The anti-drip cap 212 also seals the output 216 in order to prevent drying or curing of the toners in the toner path 208. In particular, the sealed output 216 can prevent evaporation of particular toners (e.g., water based toners). In some implementations, an air cylinder is integrated into the cap for use in controlling the movable valve 210 and, correspondingly, the movement of the anti-drip cap 212.

Figure 3A:
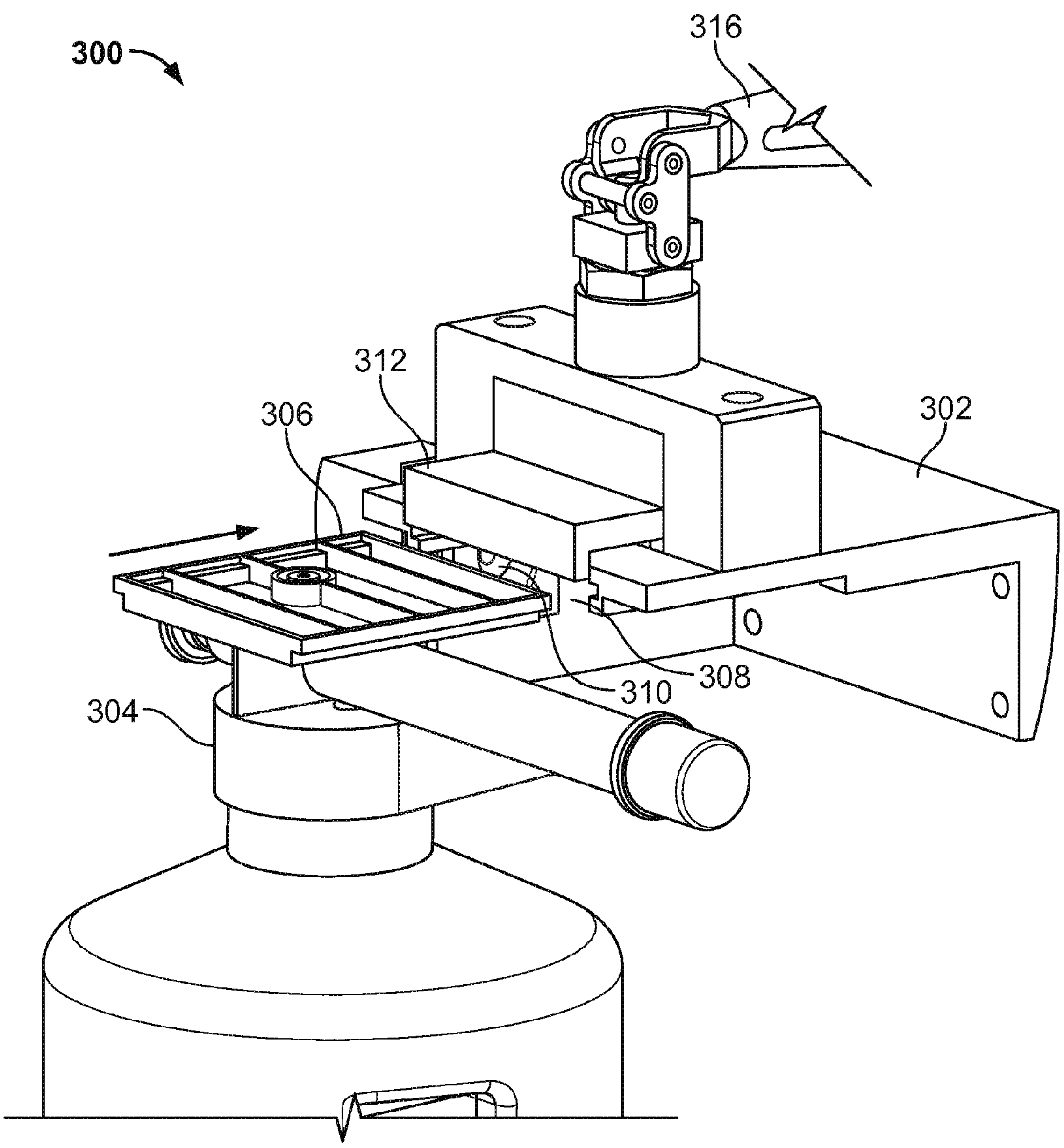
FIG. 3A is an isometric view of an example coupling between a housing and a cap and valve assembly.

FIG. 3A is an isometric view 300 of an example coupling between a housing 302 and a cap and valve assembly 304. In particular, a housing coupler 306 of the cap and valve assembly 304 is shown about to be inserted into a receiver 308 of the housing 302 as indicated by the arrow. The receiver 308 includes a valve coupler 310 that couples the housing 302 to a movable valve of the cap and valve assembly 304 (e.g., movable valve 210 of FIGS. 2A-2B). The valve coupler 310 forms a seal between the movable valve and the valve coupler 310. In particular, the movable valve is moved into communication with the valve coupler 310, which has a horseshoe shaped recess, thereby coupling a flange on the end of the movable valve 210. The valve coupler can include a T-slot coupled to an air cylinder. Additionally, the valve coupler 310 is movable in response to air pressure applied such that the valve coupler 310 and movable valve 210 move in concert with each other.

The receiver 308 also includes a clamp 312, controlled by a lever 316. The lever 316 is activated to clamp the housing 302 to the cap and valve assembly 304. The lever 316 also activates an air valve (e.g., a poppet valve). Alternatively, one or more additional valves can be used to control the air flow to the toner container in place of the poppet valve. However, using the poppet valve reduces the cost of the assembly by eliminating the cost of electro-pneumatic valves and the circuits to activate the valves. Activation of the lever 316 is described in greater detail below with respect to FIGS. 3B and 3C. The air valve allows air to flow into the cap and valve assembly 304, in particular, an input air path. In some implementations, the air pressure is regulated by sending an analog electrical signal to a variable pressure regulator. The signal is developed using Pulse Width Modulation (PWM) and low pass filtering in the flow controller. The signal is frequently adjusted as during dispensing.

Figure 3B:
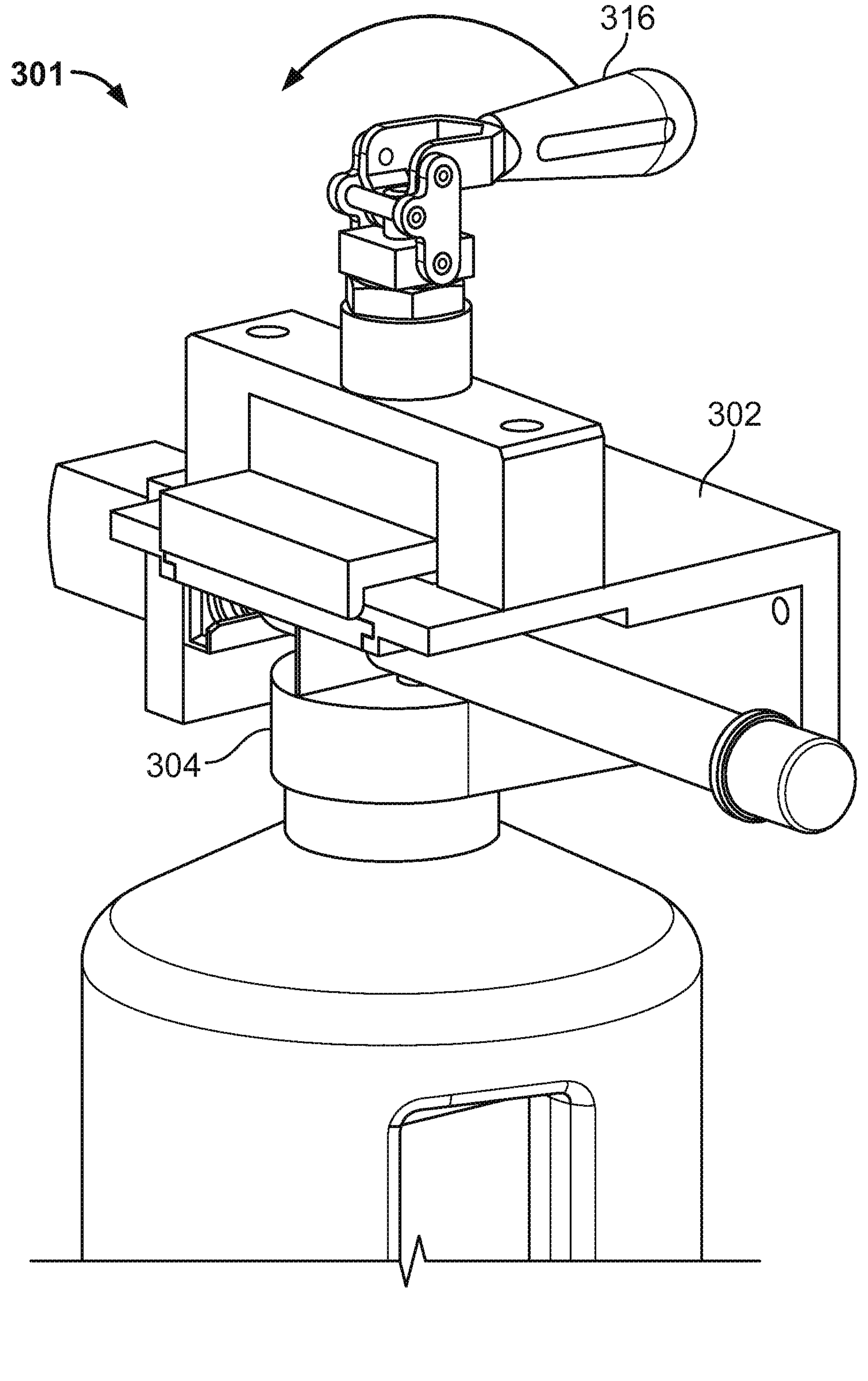
FIG. 3B is an isometric view of an example coupling between a housing and a cap and valve assembly with the cap and valve assembly inserted into the housing.

FIG. 3B is an isometric view 301 of an example coupling between a housing 302 and a cap and valve assembly 304 with the cap and valve assembly 304 inserted into the housing 302. However, the lever 316 has not been activated such that the housing 302 and cap and valve assembly 304 are not clamped together. Thus, while the cap and valve assembly 304 is positioned within the receiver 308, it is not secured to the housing 302.

Figure 3C:
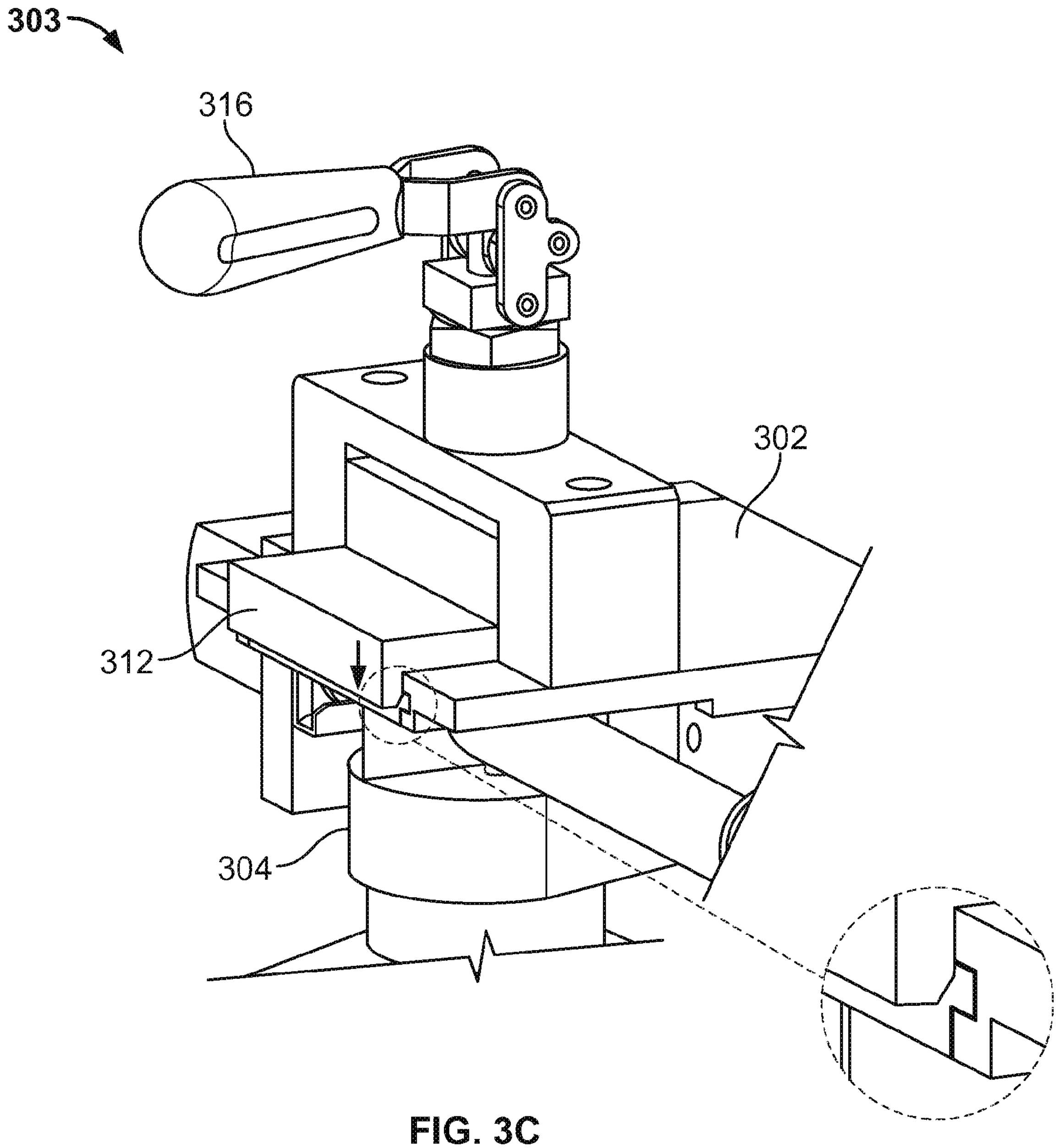
FIG. 3C is an isometric view of an example coupling between a housing and a cap and valve assembly with the cap and valve assembly secured to the housing.

FIG. 3C is an isometric view 303 of an example coupling between a housing 302 and a cap and valve assembly 304 with the cap and valve assembly 304 secured to the housing 302. In particular, the lever 316 has been articulated to a closed position that secures the cap and valve assembly 304 to the housing 302. In particular, activating the lever 316 activates clamp 312 to clamp the housing 302 to the cap and valve assembly 304 by way of a downward clamping movement.

Additionally, activating the lever 316 activates an air path in the housing 302 to the input air path of the cap and valve assembly 304. For example, the housing can include a poppet valve that is opened when the lever 316 is articulated to activate the lever 316. When the poppet valve is opened, air is allowed to pass from an input air line along a path to the input air path of the cap and valve assembly 304. However, air does not flow into the input air path of the cap and valve assembly 304 unless the movable valve is in an open position.

Figure 4:
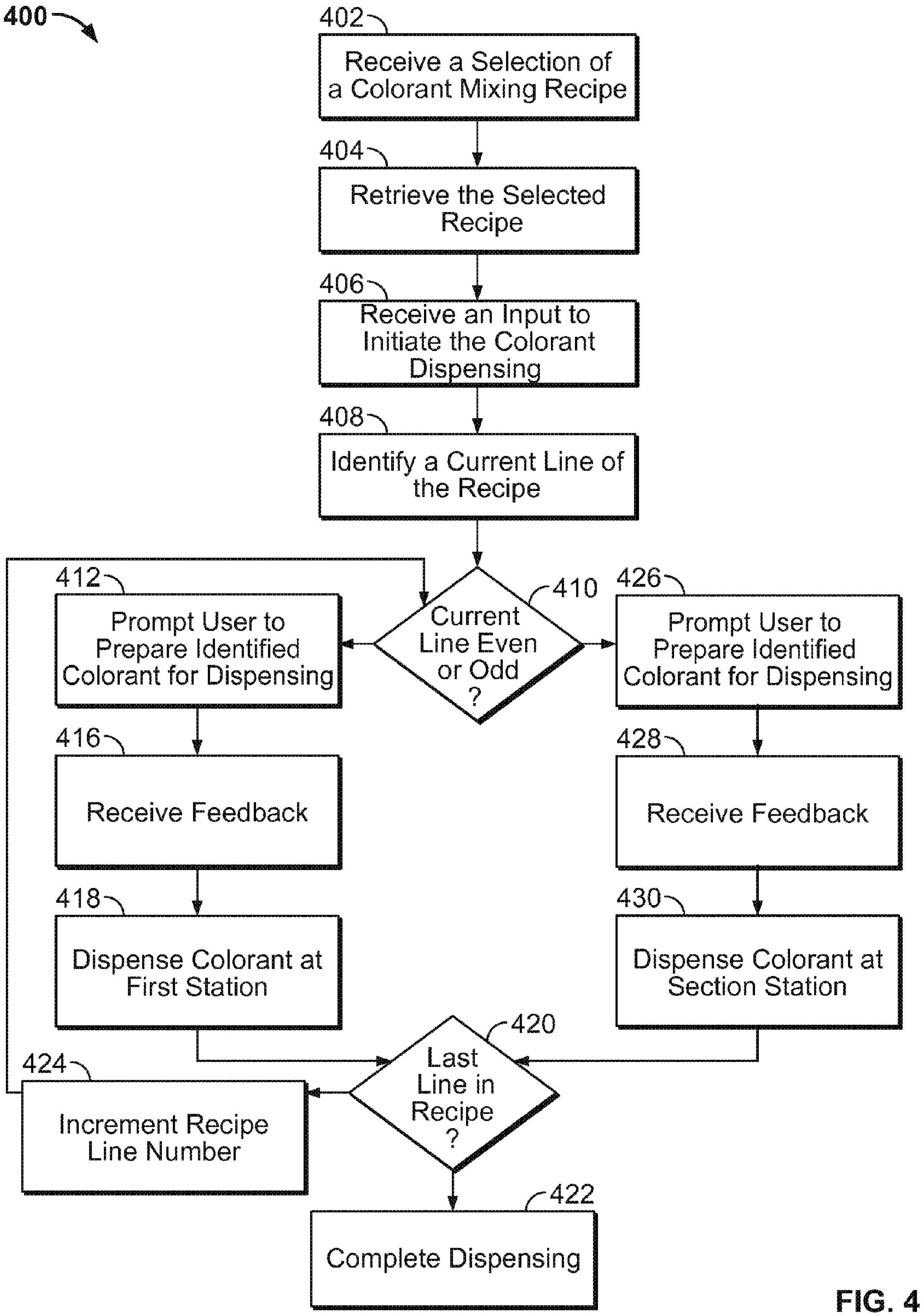
FIG. 4 is a flowchart of an example method for creating a toner mix.

FIG. 4 is a flowchart of an example method 400 for creating a color mix. For convenience, the method 400 will be described with respect to a system (e.g., toner dispensing system 100 of FIG. 1) that performs the method 400.

The system receives 402 a selection of a color mixing recipe. Receiving the selection can include receiving a user input through navigation of a collection of color mixing recipes. The recipe identifies a number of toners and amounts to create a particular mix of color. In some implementations, the recipes are identified by a particular code for the resultant color mix. The code can be identified through a user interface to the system, or alternatively, using a book or other written collection of codes. Thus, the user can select the recipe by inputting the code to the system.

The system retrieves 404 the selected recipe. A number of recipes can be stored in a recipe collection. The recipe collection can be locally stored on the system or can be remotely located. Thus, retrieval of the selected recipe can include communicating with a remote server or other computing device to request the recipe and to receive the delivered recipe. In some implementations, the received recipe is simply a group of numbered recipe lines where each line identifies a toner for the mix and a weight of the toner to dispense.

The system receives 406 an input to initiate the toner dispensing. For example, the user can provide then input to a control interface on the dispensing system. The input can include selecting a "start" button on the control interface.

The system identifies 408 a current line of the recipe. The current line identifies a particular toner and toner amount (e.g., a weight amount of the toner to dispense). Generally, the current line initially identified is line one of the recipe.

The system determines 410 whether the current line number is odd or even. When the current line number is odd, the system prompts 412 the user to prepare the identified toner for a first dispensing station. The system can prompt the user, for example, using a screen display in the control interface that identifies the toner and the dispensing station for the toner. Colors can be identified by a name, a code, or some other identifier. In some alternative implementations, the system provides a verbal prompt instead of, or in addition to, displaying the prompt.

While the system can identify each toner at a time to dispense, the recipe information can be presented to the user before hand, e.g., as a list of toners needed for the particular toner mix. As a result, the user can obtain the needed toners and have them ready to install into the appropriate dispensing station as required.

When the current line is odd, the method 400 continues by receiving 416 a confirmation that the toner has been prepared for the first dispensing station. For example, the user can provide an input to the control interface indicating that the toner is ready to dispense. For example, a button can be provided in a control interface that, when selected, indicates that the dispensing of the first station should begin. When the confirmation has been received, the system dispenses 418 toner at the first dispensing station.

Figure 5:
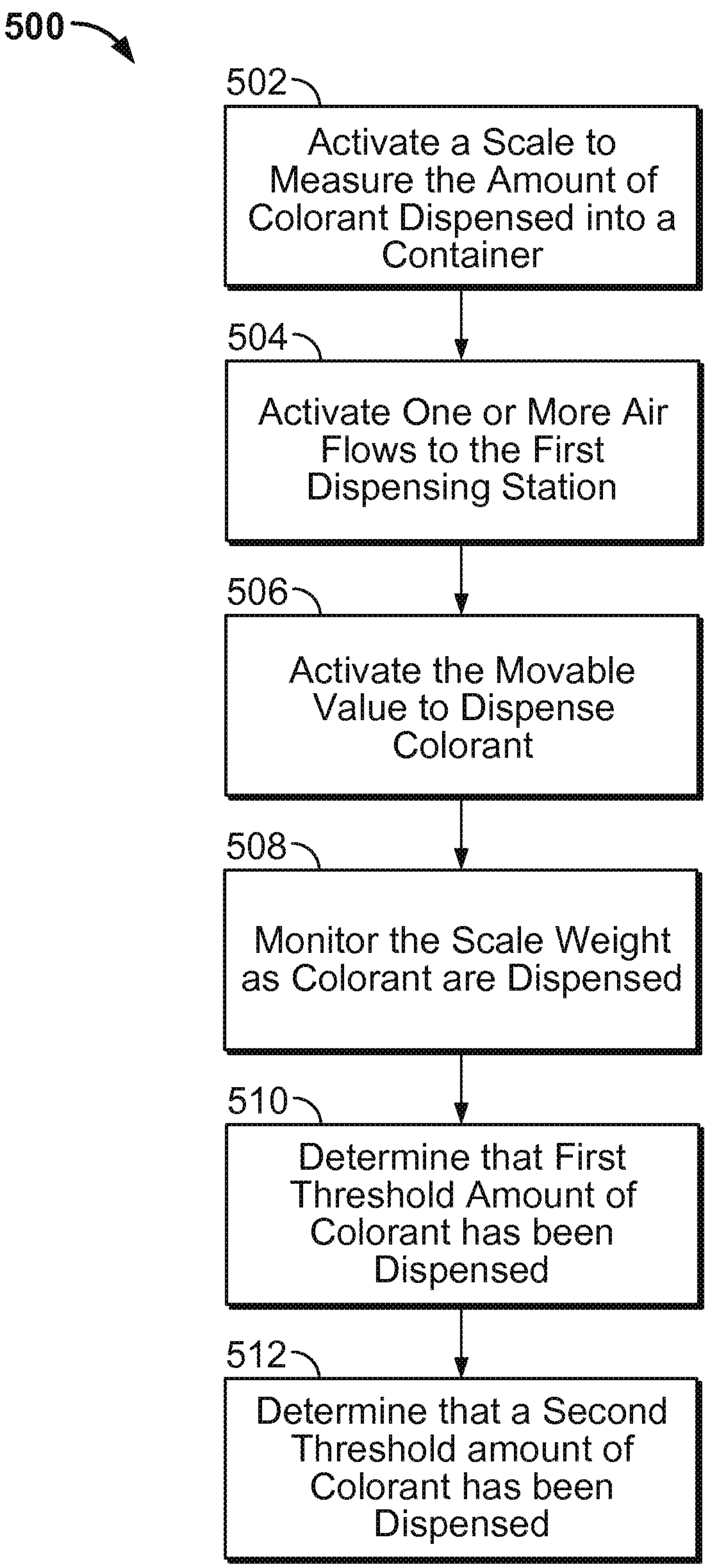
FIG. 5 is a flowchart of an example method for dispensing a toner

FIG. 5 is a flowchart of an example method 500 for dispensing a toner. For convenience, the method 500 will be described with respect to a system (e.g., toner dispensing system 100 of FIG. 1) that performs the method 500.

The system activates 502 a scale to measure the amount of toner dispensed into a container. Activating the scale can include zeroing the scale, for example, before dispensing the first toner. In some implementations, the scale is zeroed before each toner in the recipe is dispensed. Alternatively, the scale maintains a total relative to the ending weight of the previous toner dispensed.

The system activates 504 one or more air flows to the first dispensing station. For example, an input air path and air for controlling a movable valve are separate air flows having separate air sources. Alternatively, a single air flow is used that separates to the input air path and the movable valve. In some implementations, an air flow to the input air path is constantly activated. However, air is prevented from passing into a toner container because the input air path in the cap and valve assembly is closed and the valve in the housing is also closed (e.g., a poppet valve that is not open until a lever is activated).

The air flow to the movable valve is regulated such that a controllable amount of air is used to drive the movable valve. In particular, a flow controller controls an air path such that the movable valve can be controllably moved between the open and closed positions.

The air flows can be regular air (e.g., "shop air") that is simply compressed outside air. In other implementations, however, the gas used for one or more air flows is different from outside air. For example, a less reactive gas can be used for the air flow input into the toner container (e.g., Nitrogen, Argon) in order to reduce adverse effects due to interaction between the gas and the toner.

The system activates 506 the movable valve to a dispensing position and opens the air input path to pressurize the toner container. In addition, the flow controller applies a specified amount of the regulated air flow to the toner container in order to pressurize the toner container so that the toner can flow from the toner container up the input tube and along the toner path to the output.

The system monitors 508 scale weight as toners are dispensed. Monitoring the scale weight provides frequent updates as to the amount of toner that has been dispensed. In some implementations, the system identifies the scale weight 100 times per second.

The system determines 510 that first threshold amount of toner has been dispensed. In some implementations, the first threshold is a specified weight threshold relative to the weight of the toner identified in the recipe. For example, the threshold can be identified when 0.5 grams of toner remains to be dispensed. In some alternative implementations, the dispensing system gradually reduces the flow rate over a range of weight data up to the first threshold amount (e.g., beginning with 1.0 grams to be dispensed and ending with the 0.5 gram first threshold).

When the threshold has been reached, the flow controller reduces the flow rate of the toner being dispensed. In particular, the air regulator reduces the air pressure within the toner container. The air is reduced to provide a particular flow rate (e.g., 2 drops per second) based on the air necessary to flow the toner with known properties of the toner being dispensed (e.g., a viscosity of the toner). In particular, fluid characterization data is retrieved for each toner being dispensed that identifies a flow rate for a particular output aperture. The characterization information can be stored locally in the dispensing system or retrieved from a remote location as needed.

The system determines 512 that a second threshold amount of toner has been dispensed. When the second threshold amount of toner has been dispensed, the system stops the one or more air flows to end toner dispensing. In particular, closing the movable valve engages the anti-drip cap to prevent further dispensing. In some implementations, the air in the toner container is vented through the input air path prior to closing the movable valve. In some implementations, the second threshold is a specified weight threshold relative to the weight of the toner identified in the recipe. For example, the second threshold can be identified when 0.05 grams of toner remains to be dispensed.

As shown in FIG. 4, the system determines 420 whether the dispensed toner was in the last line of the recipe. When the system determines that the toner from the last line has been dispensed, the system indicates 422 that the dispensing is complete.

When the system determines that the last line has not been dispensed, the system increments 424 the recipe line and returns to the determination 410 of whether or not the recipe line number is odd or even.

When the system determines that the recipe line number is even, the system prompts 426 the user to prepare the identified toner for a second dispensing station. For example, the user can attach the identified toner to the second dispensing station using a corresponding cap and valve assembly.

The system receives 428 feedback that the toner has been prepared for the first dispensing station. For example, the user can provide an input to the control interface indicating that the toner is ready to dispense. For example, a button can be provided indicating that the dispensing of the first station should begin.

The system dispenses 430 toner at the second dispensing station. The toner can be dispensed in a similar manner as shown in FIG. 5 above.

The system again determines 420 whether the dispensed toner was in the last line of the recipe. When the system determines that the toner from the last line has been dispensed, the system indicates 422 that the dispensing is complete.

When the system determines that the last line has not been dispensed, the system again increments 424 the recipe line and returns to the determination 410 of whether or not the recipe line number is odd or even. The method then repeats as described above until the last line of the recipe has been dispensed.

Figure 6:
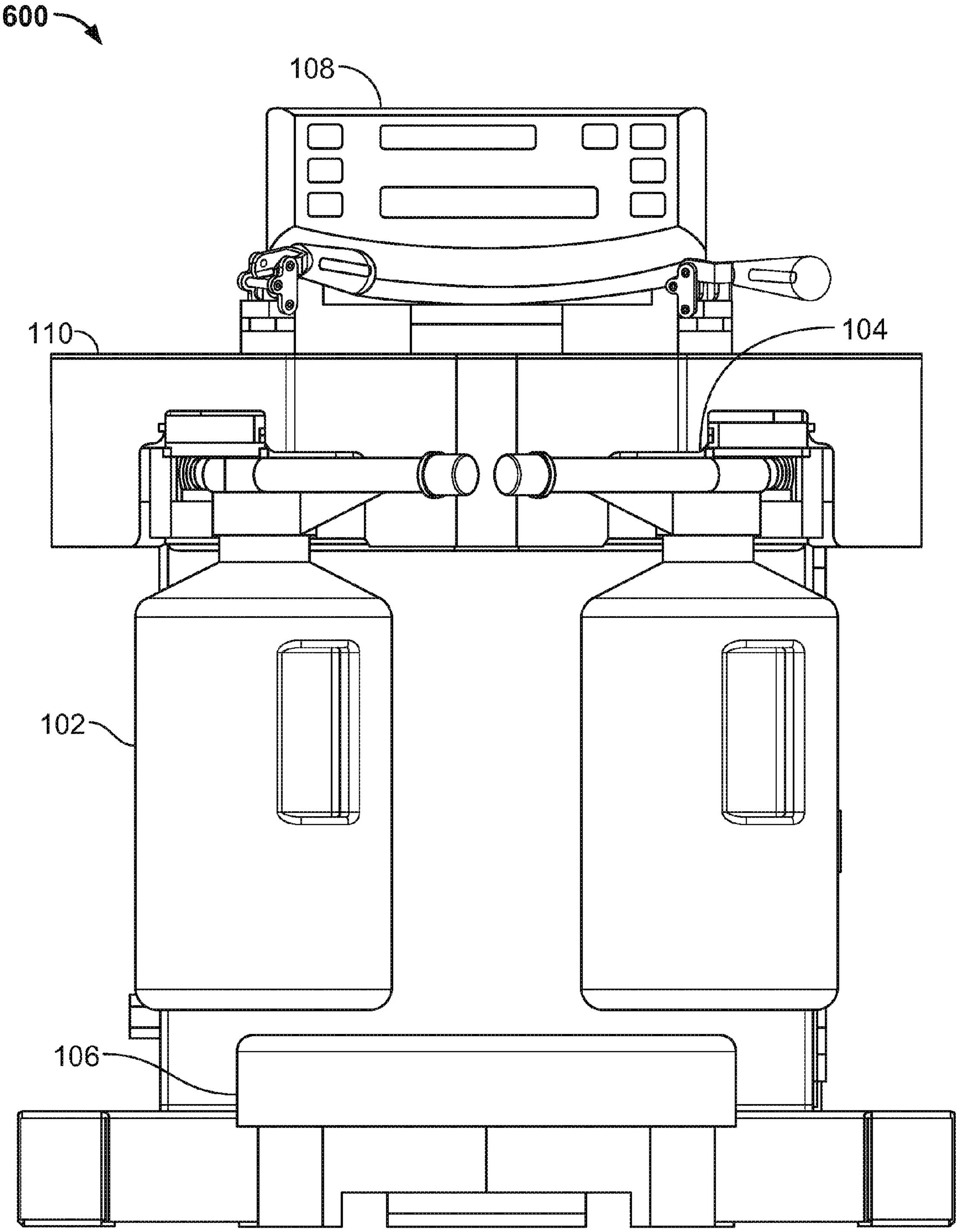
FIG. 6 is a top view of an example toner dispenser.

FIG. 6 is a front view 600 of the example toner dispenser 100. The front view 600 shows toner containers 102, cap and valve assemblies 104, scale control interface 108, and scale, 106. The front view 600 also shows the respective levers (e.g., levers 312 of FIG. 3) for securing the cap and valve assemblies 104 to the housing 110.

As shown in the front view, the scale 106 is positioned between the dispensing stations such that each cap and valve assembly 104 can dispense toners to a same container positioned on the scale 106. Additionally, the front view 600 shows that the toner containers 102 are suspended by the cap and valve assemblies 104. This allows the scale 106 to be positioned beneath the toner containers 102 so that they can be positioned closer together, reducing the size of the toner dispenser 100.

Figure 7:
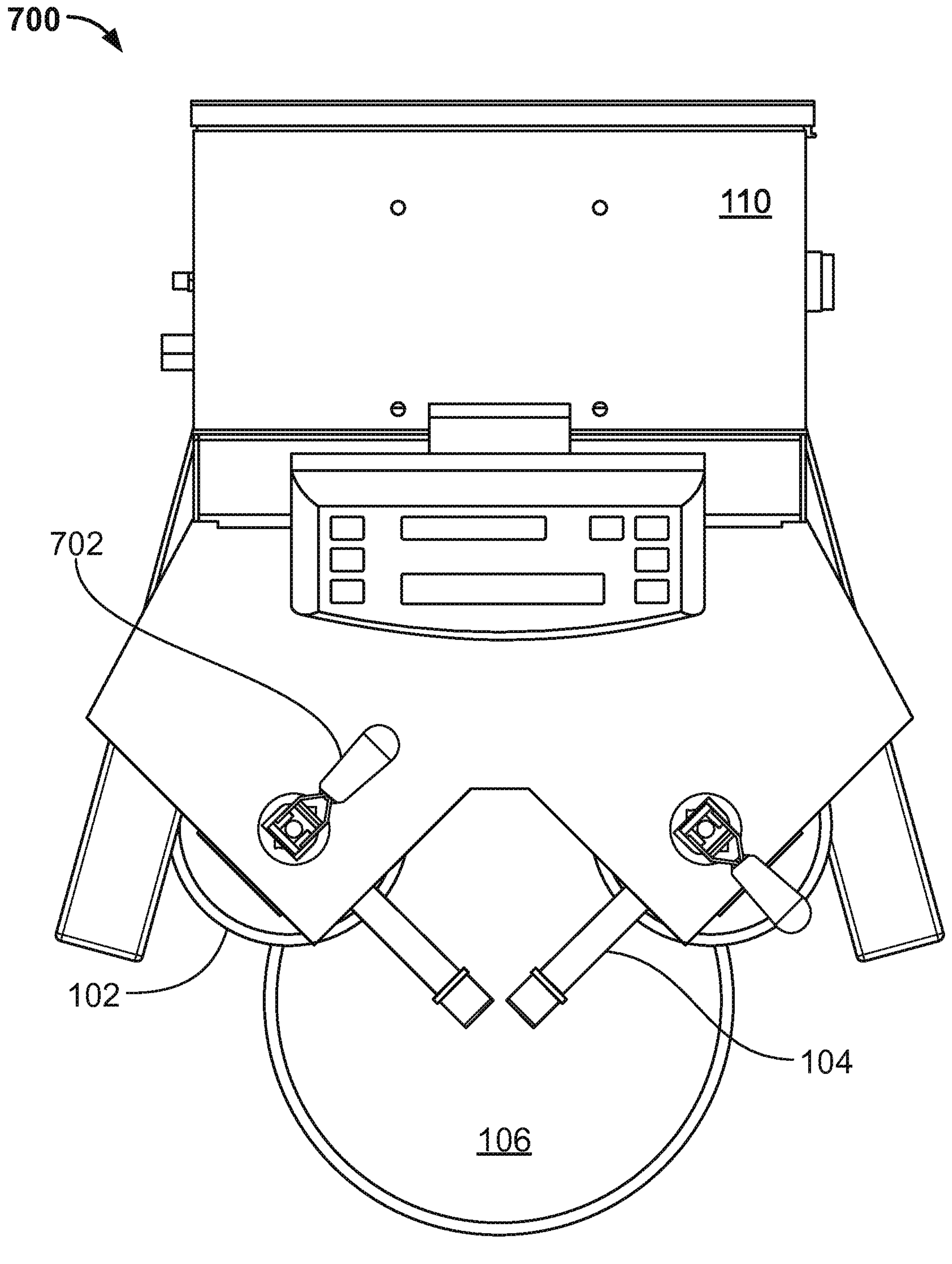
FIG. 7 is a side view of an example toner dispenser.

FIG. 7 is a top view 700 of the example toner dispenser 100. The top view 700 shows the scale 106, the housing 110, and scale control interface 108. Additionally, elongate portions of the cap and valve assemblies 104, including toner containers 102, are shown extending at an angle toward each other and the center of the scale 106. Thus, a single container placed in the center of the scale 106 can be used to capture toners dispensed from each cap and valve assembly 104.

The top view 700 also shows the operation of respective levers coupling each cap and valve assembly 104. In particular, lever 702 is shown in a first position and lever 704 is shown in a second position. The first position can be used when inserting and removing the cap and valve assembly 104. Articulating a lever to the second position shown for lever 704 can be used to secure the cap and valve assembly to the housing as described above.

Figure 8:
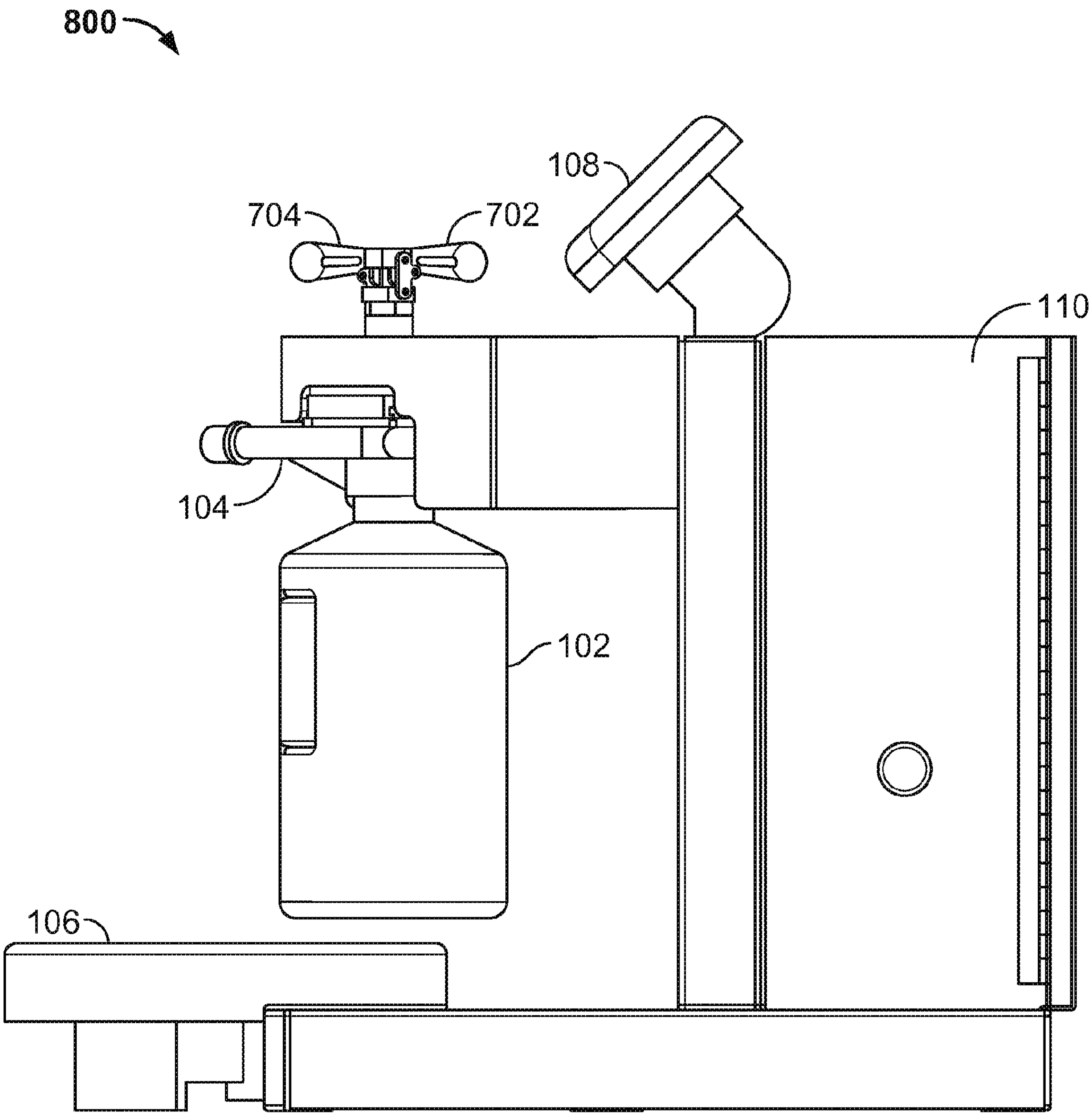
FIG. 8 is a front view of the example toner dispenser.

FIG. 8 is a side view 800 of the example toner dispenser 100. The side view 800 shows a toner container 102, cap and valve assembly 104, scale 106, scale control interface 108, and housing 110. Additionally, levers 702 and 704 for respective toner stations are shown. Additionally, the side view 800 shows that each toner container 102 can be suspended over the scale 106 so that the scale can be positioned beneath the toner containers 102 and the cap and valve assemblies 104.

In some implementations, a dispensing system can have different numbers of dispensing stations. For example, the dispensing system can have a single dispensing station that couples a single cap and valve assembly. Alternatively, a single housing can include multiple dispensing stations in addition to two that can be used to provide additional toners for creating a mix without switching out toners. Additionally, in some implementations, a multiple station dispensing system can be used in combination with additional scales to create more than one mix at a time.

In some implementations, the dispensing system can be configured to dispense toners using a different orientation of toner containers. For example, the toner containers can be inverted and the housing modified such that the cap and valve assemblies are inserted into a housing receiver with the toner container turned upside down.

The dispensing system can be applied to dispensing various toners including different types of paints including water based and solvent based paints. Additionally, inks, dyes, and other fluids can be similarly dispensed. In particular, for each type of toner, particular characteristics (e.g., viscosity) can be calculated to determine flow control requirements during dispensing.

Figure 9:
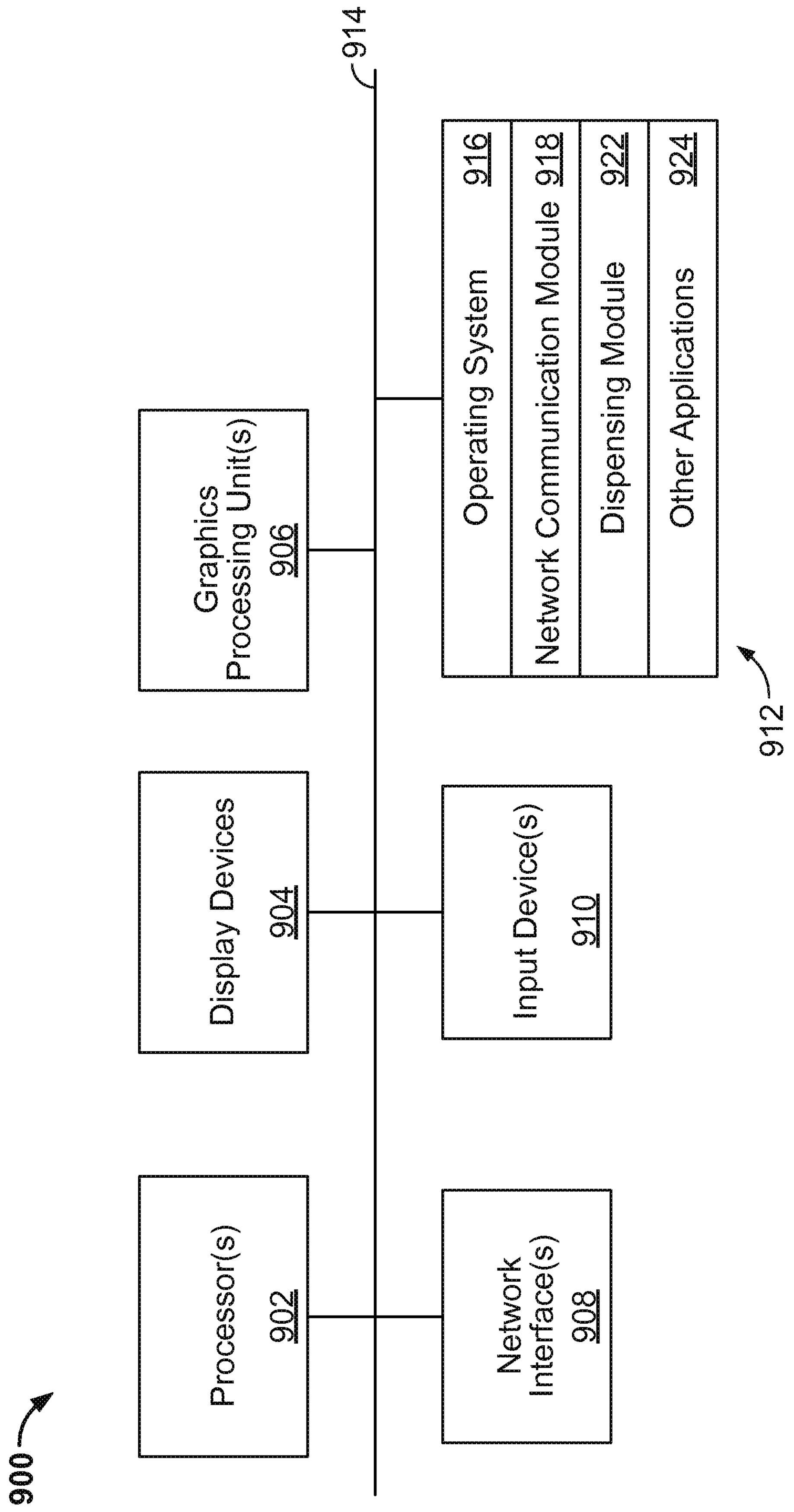
FIG. 9 is a schematic diagram of an example system architecture.

FIG. 9 is a schematic diagram of an example system architecture 900. For example, the system architecture 900 can be used to identify recipes for toner mixes, monitor scale measurements, and provide flow control for cap and valve assemblies.

The system architecture 900 is capable of performing operations for dispensing toners. The architecture 900 includes one or more processors 902 (e.g., IBM PowerPC, Intel Pentium 4, etc.), one or more display devices 904 (e.g., CRT, LCD), graphics processing units 906 (e.g., NVIDIA GeForce, etc.), a network interface 908 (e.g., Ethernet, FireWire, USB, etc.), input devices 910 (e.g., keyboard, mouse, control interface, etc.), and one or more computer-readable mediums 912. These components exchange communications and data using one or more buses 914 (e.g., EISA, PCI, PCI Express, etc.).

The term "computer-readable medium" refers to any medium that participates in providing instructions to a processor 902 for execution. The computer-readable medium 912 further includes an operating system 916 (e.g., Mac OS®, Windows®, Linux, etc.), a network communication module 918, a dispensing module 922, and other applications 924. The operating system 916 can be multi-user, multiprocessing, multitasking, multithreading, real-time and the like. The operating system 916 performs basic tasks, including but not limited to: recognizing input from input devices 910; sending output to display devices 904; keeping track of files and directories on computer-readable mediums 912 (e.g., memory or a storage device); controlling peripheral devices (e.g., disk drives, printers, etc.); and managing traffic on the one or more buses 914. The network communications module 918 includes various components for establishing and maintaining network connections (e.g., software for implementing communication protocols, such as TCP/IP, HTTP, Ethernet, etc.).

The dispensing module 920 provides various software components for performing the various functions for identifying recipes for mixing toners and dispensing the toners identified in the recipe including providing flow monitoring and control, as described with respect to FIGS. 1-8. Recipes can be stored as such on the computer-readable medium 912 for future use (e.g., to perform additional dispensing operations). Flow monitoring can include receiving inputs from a scale indicating measurements of dispensed toners. Flow control includes controlling air pressure within the toner containers to provide a specified flow rate and controlling movement of the movable valve.

The dispensing acts can be electronically controlled. Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A toner dispensing system comprising:

a toner container;

a cap and valve assembly coupled to the toner container, the cap and value assembly including:

a movable valve assembly, the movable valve assembly having a first position and a second position, a toner path, and an air inlet path, where in a first valve assembly position the toner path and the air inlet path are closed such that an output of the toner path is blocked by the cap and valve assembly, and in a second valve assembly position the toner path and the air inlet path are open;

an air assembly including a first air supply coupled to the movable valve assembly and a regulated second air supply coupled to the toner container, wherein in the second valve assembly position the second air supply is coupled to the toner container using the air inlet path; and a control assembly for controlling the second air supply, and wherein the control assembly further controls the first air supply such that the first air supply acts to selectively position the movable valve assembly in an open and a closed position.

2. The toner dispensing system of claim 1, further comprising:

a scale for measuring dispensed toners from the cap and valve assembly; and a flow control system that regulates the second air supply to control the flow of toner through the toner path based on the scale measurement.

3. The toner dispensing system of claim 2, where controlling the flow of toner further includes adjusting the second air supply to the toner container, and where the air pressure of the toner container determines the flow rate of toner through the toner path.

4. The toner dispensing system of claim 1, the cap and valve assembly further comprising:

an elongated outer tube and an elongated inner tube, the elongated inner tube being movable relative to the outer tube, the elongated outer tube including openings for the air inlet path and the toner path, the inner tube including the air inlet path and the toner path, where the movable valve assembly moves the inner tube relative to the outer tube such that the air inlet path and toner path are aligned with respective openings in the outer tube.

5. The toner dispensing system of claim 1, the cap and valve assembly further comprising an anti-drip cap where the anti-drip cap is movable relative to an outlet of the toner path such that in a first position the outlet is open allowing toner to pass through the outlet from the toner path and in a second position the outlet is closed sealing the toner path preventing substantially all toner from passing through the outlet.

6. The toner dispensing system of claim 1, where the air inlet path selectively allows air to be injected into the toner container.

7. The toner dispensing system of claim 1, where the first air supply and the second air supply have a common source.

8. The toner dispensing system of claim 1, where the first air supply and the second air supply have a separate source.

9. A method comprising:

identifying an amount of toner to dispense;

initializing a scale to measure the amount of dispensed toner;

activating a first air supply, the first air supply configured to provide air to a toner container when a valve is moved to a dispensing position;

activating a second air supply, the second air supply moving the valve to the dispensing position such that toner is dispensed at a specified flow rate;

monitoring the scale to determine when a first threshold amount of toner has been dispensed;

when the threshold amount of toner has been dispensed, reducing the flow rate of the toner to a reduced flow rate;

monitoring the scale to determine when a second threshold amount of toner has been dispensed; and deactivating the first air supply when the second threshold amount of toner has been dispensed, the deactivating of the first air supply stopping the flow of toner.

10. The method of claim 9, further comprising:

deactivating the second air supply when the second threshold amount of toner has been dispensed, the deactivating of the second air supply moving the valve out of the dispensing position.

11. The method of claim 9, further comprising:

receiving a user selection of a recipe, the recipe identifying toners and corresponding amounts to be dispensed; and dispensing a first toner in the recipe and then a second toner from the recipe.

12. The method of claim 9, where reducing the flow rate includes reducing a pressure in the toner container provided by the first air supply.

13. The method of claim 9, where moving the valve to the dispensing position opens a toner path and an air path, the air path allowing the air to be injected into the toner container and where moving to a closed position seals the toner path and seals the air path.

14. A method comprising:

providing a scale to measure an amount of a dispensed toner;

activating a first air supply, the first air supply configured to provide air to a toner container when a valve is moved to a dispensing position;

activating a second air supply, the second air supply moving the valve to the dispensing position such that toner is dispensed;

monitoring the scale to determine when a desired amount of toner has been dispensed; and deactivating the first air supply when the desired amount of toner has been dispensed, the deactivating of the first air supply stopping the flow of toner.

15. The method of claim 14 comprising activating the second air supply to move the vale to the dispensing position prior to activating the first air supply to provide air to the toner container.

16. The method of claim 14 comprising deactivating the second air supply after deactivating the first air supply.

17. The method of claim 15 comprising deactivating the second air supply after deactivating the first air supply.

* * * * *